(12) United States Patent
Yun

(10) Patent No.: US 10,800,104 B2
(45) Date of Patent: Oct. 13, 2020

(54) 3D PRINTING DEVICE FOR MULTIPLE MATERIALS AND 3D PRINTING METHOD FOR MULTIPLE MATERIALS

(71) Applicant: Korea Institute of Machinery & Materials, Daejeon (KR)

(72) Inventor: Hui Suk Yun, Changwon-si (KR)

(73) Assignee: Korea Institute of Machinery & Materials, Daejeon (KR)

( * ) Notice: Subject to any disclaimer, the term of this patent is extended or adjusted under 35 U.S.C. 154(b) by 228 days.

(21) Appl. No.: 15/926,238

(22) Filed: Mar. 20, 2018

(65) Prior Publication Data

US 2018/0272608 A1    Sep. 27, 2018

(30) Foreign Application Priority Data

Mar. 24, 2017 (KR) .......................... 10-2017-0037964
Jul. 21, 2017 (KR) .......................... 10-2017-0092991

(51) Int. Cl.
  *B28B 1/00* (2006.01)
  *B29C 64/336* (2017.01)
  (Continued)

(52) U.S. Cl.
  CPC ............ *B29C 64/336* (2017.08); *B28B 1/001* (2013.01); *B29C 64/124* (2017.08); *B29C 64/194* (2017.08); *B29C 64/20* (2017.08); *B29C 64/218* (2017.08); *B29C 64/223* (2017.08); *B29C 64/245* (2017.08); *B29C 64/35* (2017.08);
  (Continued)

(58) Field of Classification Search
  CPC ......... B33Y 10/00; B33Y 30/00; B33Y 40/00; B29C 67/00; B29C 2791/001; B29C 64/40; B29C 64/357; B29C 64/35; B29C 64/223; B29C 64/218; B29C 64/241; B29C 64/245; B29C 64/194; B29C 64/124;
  (Continued)

(56) References Cited

U.S. PATENT DOCUMENTS

| | | | |
|---|---|---|---|
| 2008/0171284 A1* | 7/2008 | Hull ...................... | B29C 64/106 430/252 |
| 2012/0195994 A1* | 8/2012 | El-Siblani .............. | B33Y 10/00 425/174.4 |
| 2013/0186558 A1 | 7/2013 | Comb et al. | |

FOREIGN PATENT DOCUMENTS

| | | |
|---|---|---|
| JP | 05318606 | 3/1993 |
| JP | H0582530 U | * 11/1993 |

(Continued)

*Primary Examiner* — Xiao S Zhao
*Assistant Examiner* — Ninh V Le
(74) *Attorney, Agent, or Firm* — Harness, Dickey & Pierce, P.L.C.

(57) ABSTRACT

The present invention relates to a 3D printing device for multiple materials comprising: a material transfer unit comprising at least two lines; a material supply unit to supply at least one type of printing material on each line of the material transfer unit; a thickness control unit to control a thickness of a material supplied by the material supply unit; a 3D printing module to solidify the material controlled with the thickness by the thickness control unit to a predefined shape to solidify the material on one line and to move to the other line so as to solidify the material on the other line; a material processing module to perform washing or drying for the material solidified by the 3D printing module; and a collecting module to collect the printing material unused during the printing.

9 Claims, 20 Drawing Sheets

(51) Int. Cl.
  *B29C 64/218* (2017.01)
  *B29C 64/35* (2017.01)
  *B29C 64/357* (2017.01)
  *B29C 64/223* (2017.01)
  *B33Y 10/00* (2015.01)
  *B33Y 30/00* (2015.01)
  *B29C 64/20* (2017.01)
  *B29C 64/245* (2017.01)
  *B29C 64/194* (2017.01)
  *B29C 64/124* (2017.01)
  *B33Y 40/00* (2020.01)

(52) U.S. Cl.
  CPC ............ *B29C 64/357* (2017.08); *B33Y 10/00* (2014.12); *B33Y 30/00* (2014.12); *B33Y 40/00* (2014.12)

(58) Field of Classification Search
  CPC ... B29C 64/129; B29C 64/255; B29C 64/147; B29C 64/336; B29C 64/209; B29C 64/236; B28B 1/001
  See application file for complete search history.

(56) References Cited

FOREIGN PATENT DOCUMENTS

| | | | |
|---|---|---|---|
| JP | H0872153 A | * | 3/1996 |
| JP | 2010516498 A | | 5/2010 |
| JP | 2013103346 A | | 5/2013 |
| KR | 20160022532 A | * | 3/2016 |
| KR | 101662894 B1 | | 10/2016 |
| KR | 2017/0010290 A | | 1/2017 |
| WO | WO-2016/084367 A1 | | 6/2016 |

* cited by examiner

[FIG. 1]
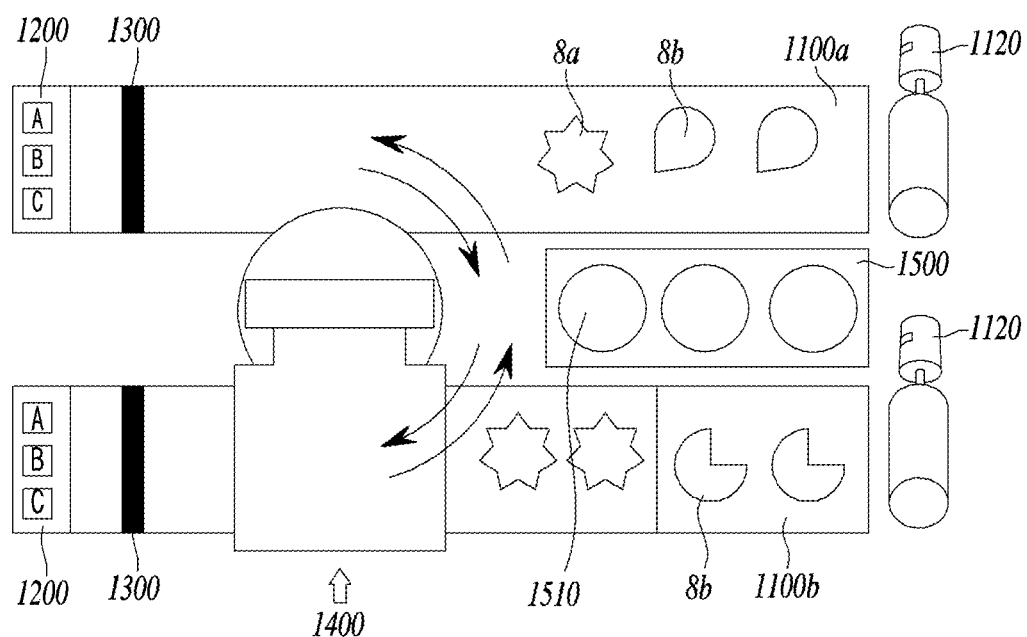

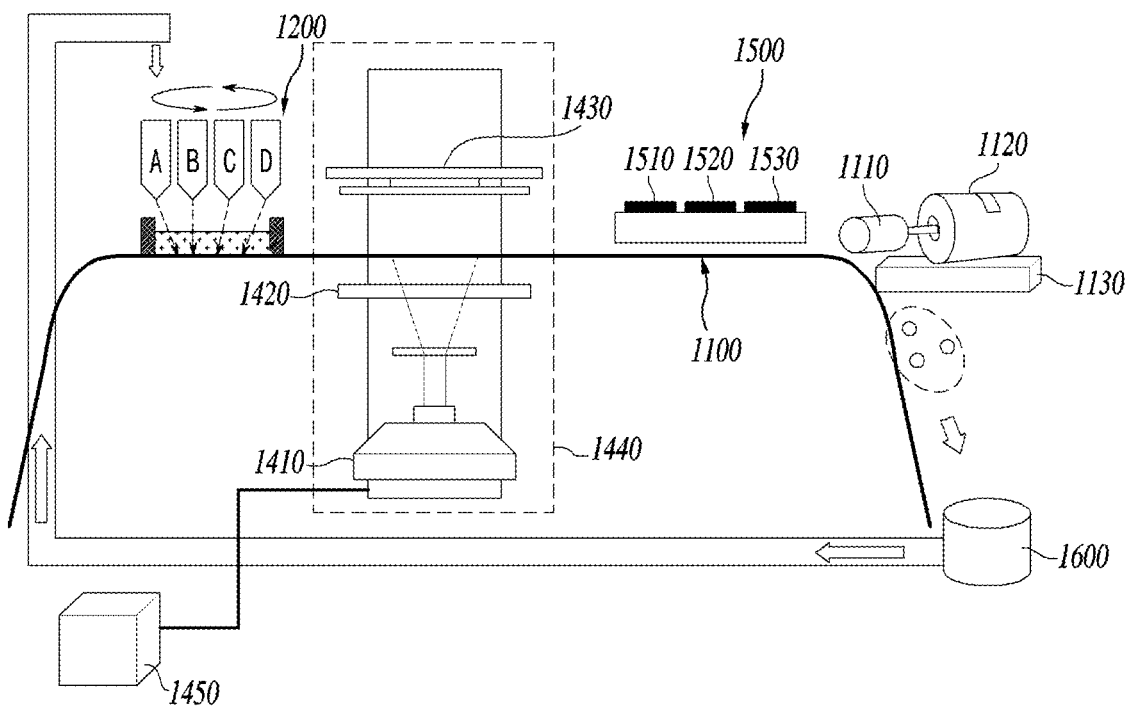
[FIG. 2]

[FIG. 3]
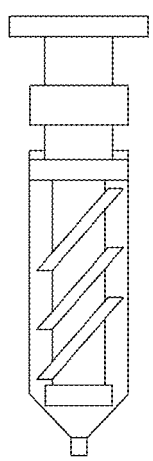

[FIG. 4]
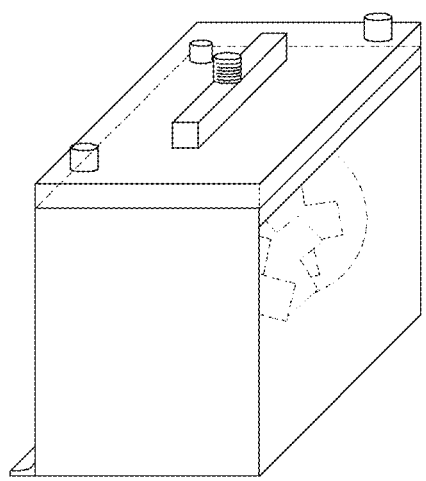

[FIG. 5]
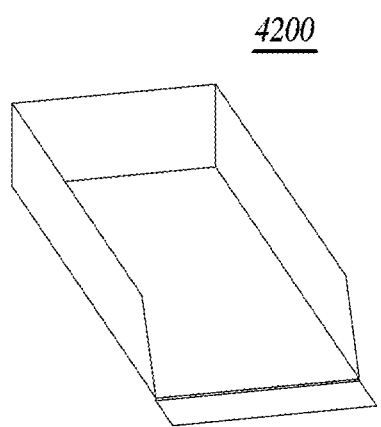

[FIG. 6]
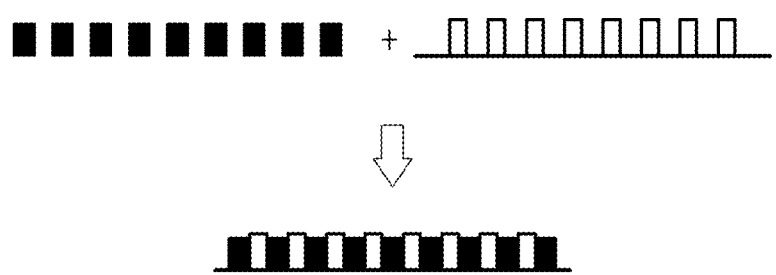

[FIG. 7]
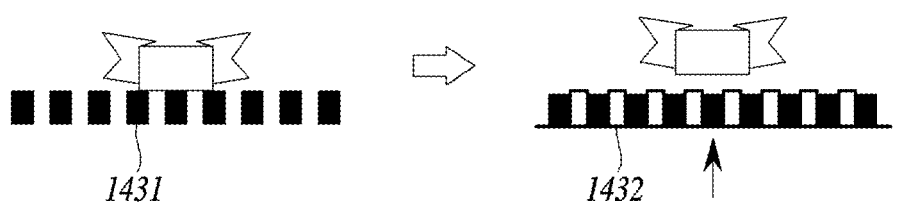

[FIG. 8]
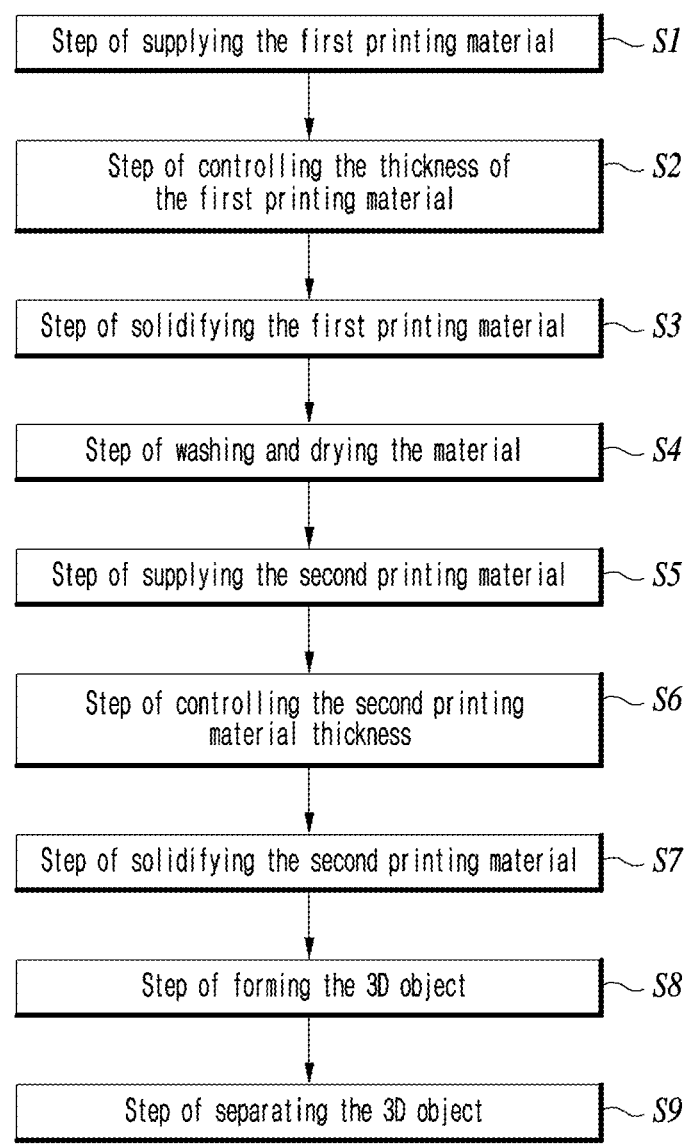

[FIG. 9]
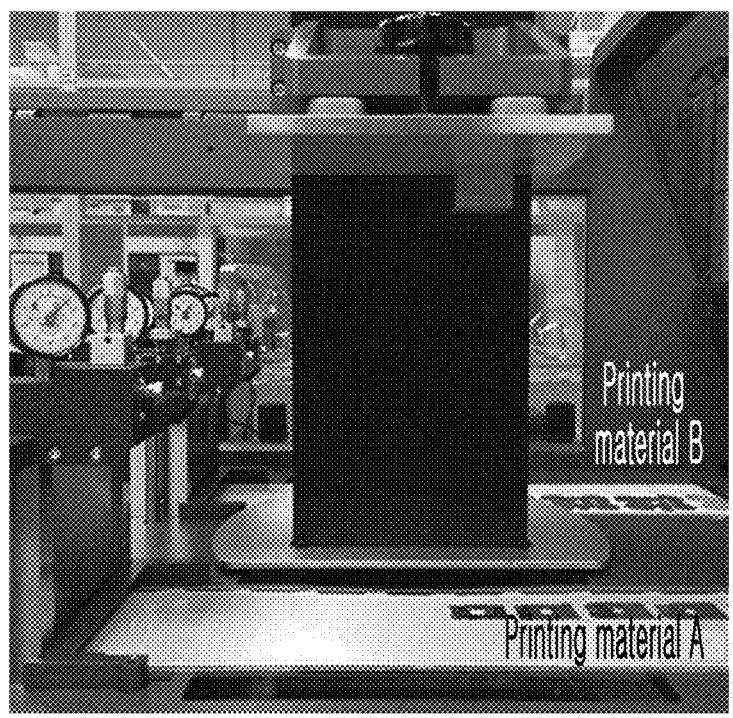

[FIG. 10]
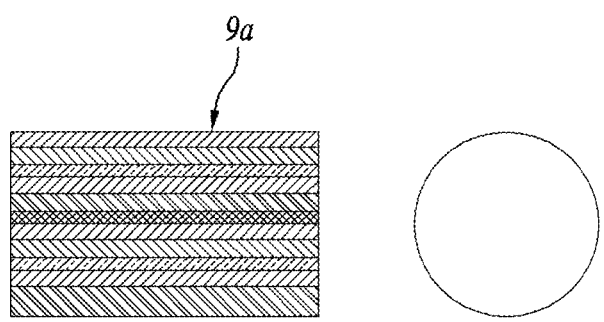

[FIG. 11]
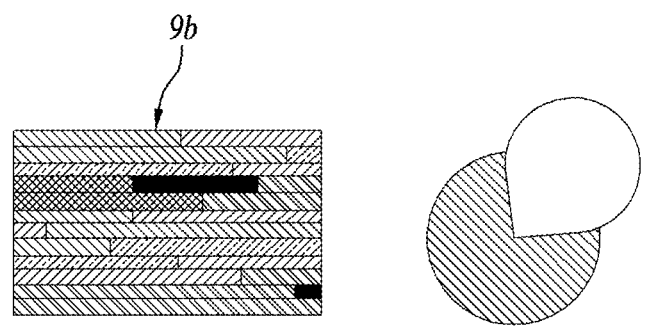

[FIG. 12]
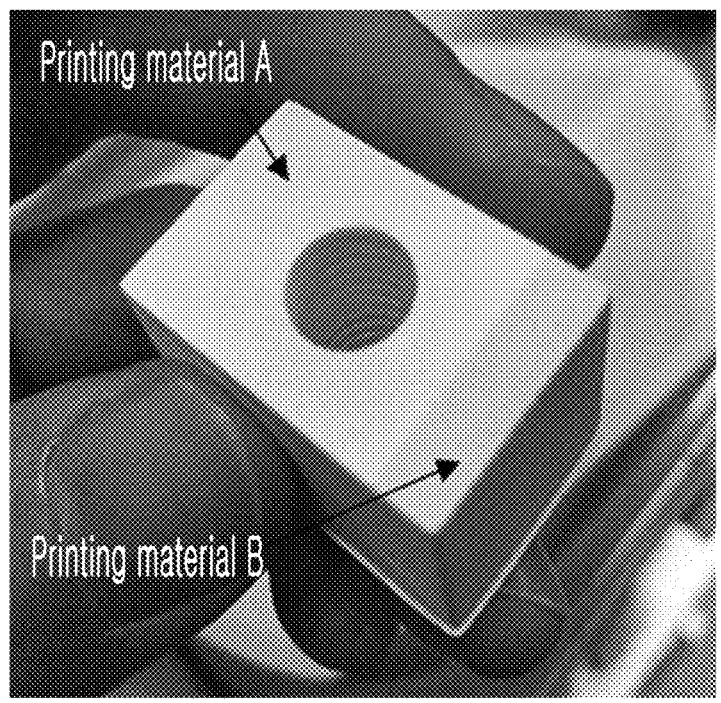

[FIG. 13]
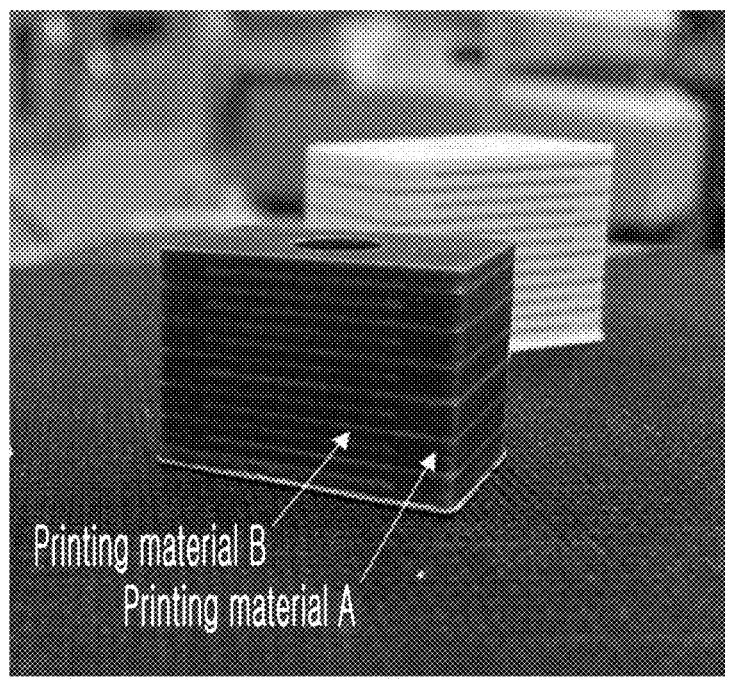

[FIG. 14]
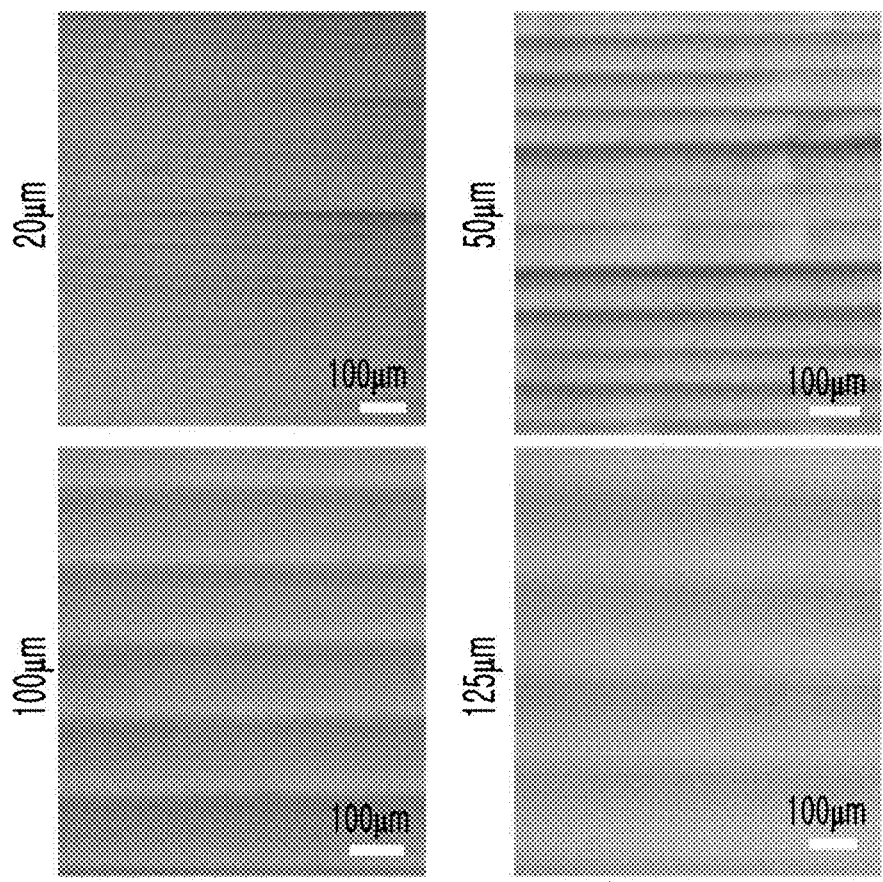

[FIG. 15]
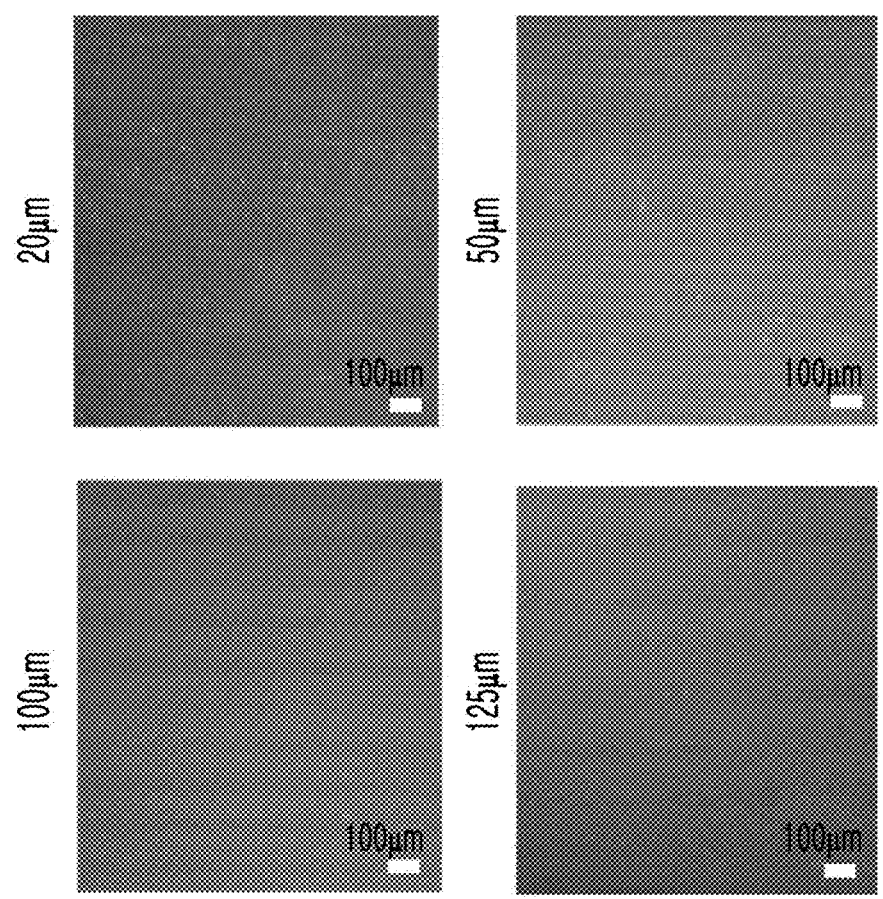

[FIG. 16]
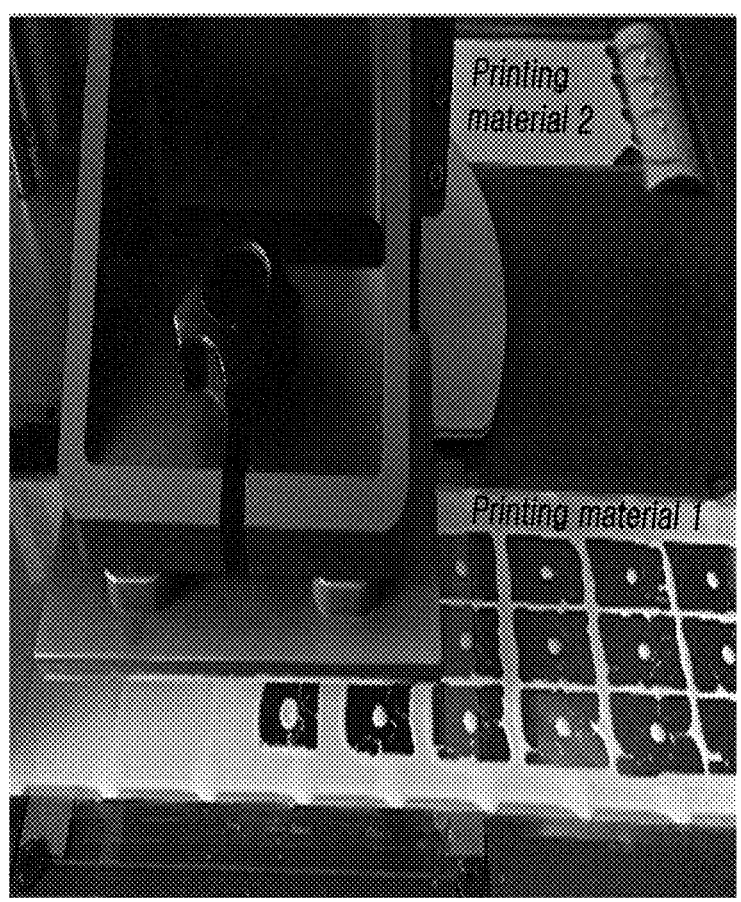

[FIG. 17]
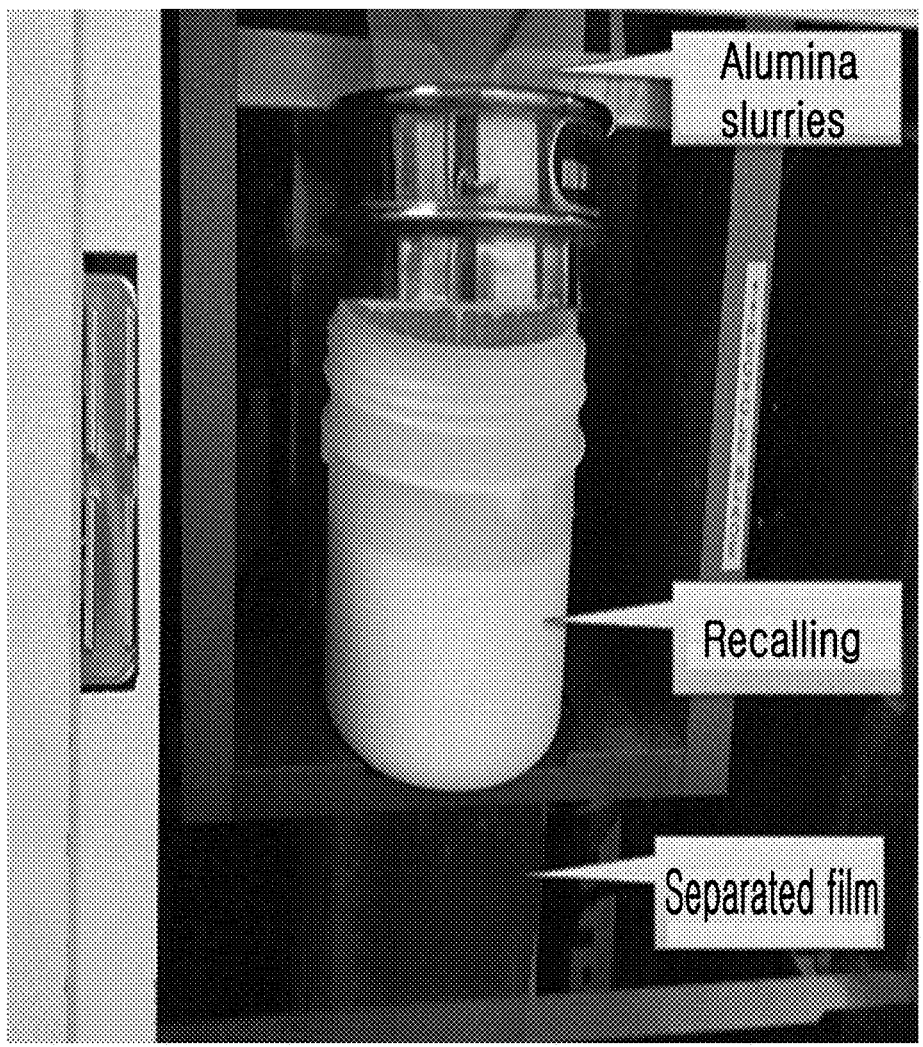

[FIG. 18]
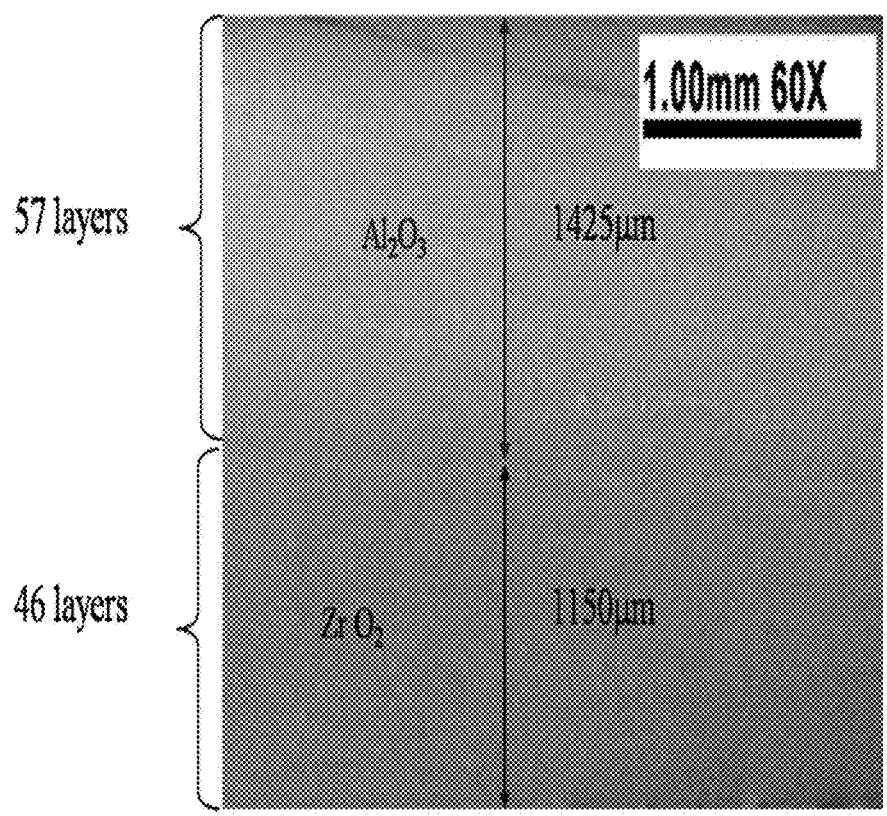

[FIG. 19]
Printing material 1   Printing material 2

[FIG. 20]
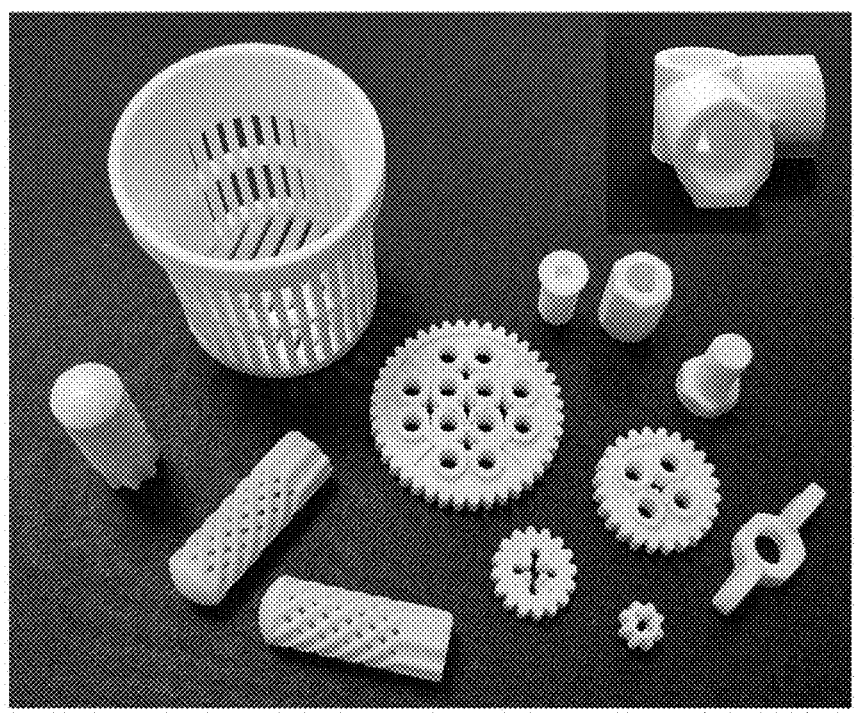

3D PRINTING DEVICE FOR MULTIPLE MATERIALS AND 3D PRINTING METHOD FOR MULTIPLE MATERIALS

This application claims the benefit of Korean Patent Application Nos. 10-2017-0037964, filed on Mar. 24, 2017 and 10-2017-0092991, filed on Jul. 21, 2017, in the Korean Intellectual Property Office, the disclosure of both of which is incorporated herein in their entirety by reference.

TECHNICAL FIELD

The present invention relates to a 3D printing device for multiple materials and a 3D printing method for multiple materials.

BACKGROUND ART 3D printer was developed for the purpose of making prototypes before commercializing products in the enterprises. 3D Systems Inc. of the United States was known as the enterprise which developed the first 3D printer that solidifies plastic liquids to produce 3D objects in the early 1980s. The scope of materials which were limited to the plastics in the early stage has been expanded to other materials such as nylon and metals, entering into commercialization stages in various fields as well as industrial prototypes.

3D printing mainly comprises steps of modeling, printing, and finishing. Modeling is a step of producing a 3D drawing, which uses a 3D CAD (computer aided design), a 3D modeling program, a 3D scanner or the like. Printing is a step of creating an object using the 3D drawings produced in the modeling step, performed by methods such as a lamination method. The time required depends on a size and complexity of the object. Finishing is a step of supplementing the output object, which includes coloring, surface polishing, assembling partial objects, or the like.

Meanwhile, a method of 3D printing for forming a three-dimensional structure by laminating two-dimensional structures layer by layer is forming a three-dimensional shape by stacking layers of powder (of polymer or metal, etc.), or materials of liquid or fiber format. The thinner the layer is, the more precise shape may be obtained. The detailed classification will be described as below.

A material extrusion is a method of melting thermoplastic materials mainly of a filament form in a nozzle, and pushing the molten material to a portion for making a desired shape and solidifying the same, to laminate from bottom-up. This method has an advantage in relatively easy application to various materials, but also has a disadvantage in resulting in rough surface and relatively longer production time compared to other methods.

Vat photopolymerization method refers to a method of projecting a laser or a UV beam onto a water tank containing a photocurable liquid resin to solidify the portion where the light source comes into contact and laminate the same. This method has an advantage in making smooth and detailed surface with high precision, but the manufacturing cost is higher than other types of printer.

Powder bed fusion method is represented by a selective laser sintering (SLS) method, which is a method of melting a large amount of small powdered plastic, metal, and glass by laser, solidifying them to laminate layers in a three-dimensional shape. Because SLS is fast and uses a wide range of materials, there is a great advantage to compensate for the drawbacks of 3D printers that have material limitations. However, there is a disadvantage in that the size of the product is limited according to the size of the powder mass and the price is very expensive compared to other methods.

Binder jetting method refers to a method of spraying a binder solution that has a role as an adhesive, such as glue, on a powdered material to bind the powders.

Material jetting method refers to a method in which a two-dimensional structure is formed by directly spraying an ink-format material in the same manner as an ink-jet printer, and then repeatedly stacking up to form a three-dimensional shape and curing by a UV beam or the like.

Sheet lamination method refers to a method of manufacturing a three-dimensional shape by stacking materials of paper or film shape layer by layer, making a shape with a laser or a cutter, and then repeating the same process.

Additionally, the direct energy deposition (DED) method is mainly applied to metals and refers to a method in which materials of powder or wire are directly and simultaneously sprayed on the surface of a high energy laser beam to melt the materials and laminate them in a three-dimensional shape.

Meanwhile, Korean Patent Application No. 10-2017-0010290 (hereinafter referred to as "prior art") discloses a 3D ceramic printer and a 3D printing method, as a conventional art related to a lamination type 3D printing device. The prior art is an invention of the present inventors, and discloses a photopolymerization printing technology of changing a material supplying method from the above-described vat photopolymerization to the film photopolymerization with the effect of reducing the molding time and the amount of the materials used through the continuous supply of the films. However, the prior art is limited in that the printing materials solidified in each layer is restricted to a single material by supplying the film in a single line, without the washing and drying process in the lamination of each layer, resulting in difficulties in preventing mixing among the materials and in controlling the material distribution.

PRIOR ART REFERENCE

Patent Reference (Patent Reference 1) Korean Patent Publication No. 10-2017-0010290

DISCLOSURE

Technical Problem

It is an object of the present invention to provide a 3D printing device to selectively inject printing materials to respective layers and a 3D printing method thereof.

It is another object of the present invention to provide the 3D printing device and the 3D printing method capable of preventing mixing of printing materials between layers of a multi-layer 3D object.

It is yet another object of the present invention to provide the 3D printing device and the 3D printing method capable of easily separating the 3D object from the printing device.

Technical Solution

To achieve the abject above, the present invention provides a 3D printing device for multiple materials comprising: a material transfer unit comprising at least two lines; a material supply unit to supply at least one type of printing material on each line of the material transfer unit; a thickness control unit to control a thickness of a material supplied by the material supply unit; and a 3D printing module to solidify the material controlled with the thickness by the thickness control unit to a predefined shape to solidify the material on one line and to move to the other line so as to solidify the material on the other line.

Additionally, the 3D printing device for multiple materials according to an embodiment of the present invention may further comprise a material processing module to wash the material solidified by the 3D printing module.

Additionally, the 3D printing device for multiple materials according to an embodiment of the present invention may further comprise a material processing module to dry the material solidified by the 3D printing module.

Additionally, the 3D printing device for multiple materials according to an embodiment of the present invention may further comprise a collecting module to collect the printing material unused at the printing module among the printing material.

Additionally, the 3D printing device for multiple materials according to an embodiment of the present invention may be applied with top-down method of forming one layer of the printing material and laminating the other layer coming into contact with a bottom surface of the one layer.

Additionally, the material transfer unit may comprise: at least one roll element on which the line is wrapped; a motor to drive the roll element; and a height control element to control a height of the roll element.

Additionally, the material supply unit may comprise at least one among a syringe type equipped with a mixing screw, an extrusion container type equipped with a mixing agitator, and a slurry supply plate type of applying the printing material on the plane in the line during the rotation of the line wrapped on the material transfer unit.

Additionally, the syringe type material supply unit may comprise a cylinder to accommodate the printing material therein; the mixing screw equipped inside the cylinder; an extrusion syringe to extrude the printing material on the line; and a hydraulic motor to induce a vertical movement of the extrusion syringe.

Additionally, the 3D printing module may form a portion of a single layer by solidifying the printing material on one line of the material transfer unit, and to move to the other line of the material transfer unit with a portion of the single layer attached thereto so as to solidify the printing material on the other line of the material transfer unit brought into contact with a portion of the single layer on an identical plane, so as to form the single layer comprising different components.

Additionally, the 3D printing module may form a single layer by solidifying the printing material on one line of the material transfer unit, and to move to the other line of the material transfer unit with the single layer attached thereto so as to solidify the printing material on the other line of the material transfer unit brought into contact with the single layer on a different plane, so as to form the single layer comprising one component.

Additionally, the 3D printing module may comprise: a light emission unit; a substrate on which the line supplied with the printing material is positioned; a build plate to which the printing material on the line is attached; a printing chamber to accommodate the light emission unit, the substrate, and the build plate therein, capable of moving in a parallel direction to the material transfer unit; and a vacuum pump to remove air in the printing chamber.

Additionally, the substrate may be provided in a transparent material in order to pass through the light irradiated from the light emission unit.

Additionally, the substrate may control a height of the printing material deposited on a top surface of the substrate by moving upward and downward.

Additionally, the build plate may comprise: a concave build plate formed with punched parts repeatedly to which the printing material is attached; and a convex build plate formed with protruding parts repeatedly corresponding to be inserted to the punched part of the concave build plate, wherein the convex build plate and the concave build plate are independently driven upward and downward, and the protruding part is formed to be longer than a depth of the punched part, so as to separate the material attached on the concave build plate when coupling the convex build plate and the concave build plate.

Additionally, the protruding part may have one end inserted to the punched part having a cross-sectional area smaller than that of the other end on a bottom direction of the convex build plate.

A 3D printing method for multiple materials according to an embodiment of the present invention may comprise the following steps of: a) supplying a printing material from a material supply unit having at least one type of printing material to a first line of a material transfer unit; b) controlling a thickness of the printing material supplied in the step a) by a first thickness control unit; c) solidifying the printing material controlled with the thickness in the step b) as being attached on a 3D printing module; d) supplying the printing material to a second line which is differed from the line in the step a); e) controlling a thickness of the printing material supplied in the step d) by a second thickness control unit; f) moving the printing material solidified in the step c) to the second line by moving the 3D printing module and solidifying the same brought into contact with the printing material controlled with the thickness in the step e); and g) moving the printing material solidified in the step f) to the first line by moving the 3D printing module and solidifying the same brought into contact with the printing material; h) moving the printing material solidified in the step g) to the second line by moving the 3D printing module and bringing the same into contact with the printing material; and i) forming a multi-layer 3D object by repeating the steps g) to h).

Additionally, the 3D printing method for multiple materials according to an embodiment of the present invention may further comprise a step of j) separating the multi-layer 3D object formed in the step i) from the 3D printing module.

Additionally, the 3D printing method for multiple materials according to an embodiment of the present invention may further comprise a step of washing the solidified material by moving to the material processing module by moving the 3D printing module, after the step of solidifying the printing material.

Additionally, the 3D printing method for multiple materials according to an embodiment of the present invention may further comprise a step of drying the solidified material by moving to the material processing module by moving the 3D printing module, after the step of solidifying the printing material.

Additionally, in the step c), the printing material controlled with the thickness may be attached in contact with the bottom surface of the build plate of the 3D printing module.

Additionally, in the steps f) to g), the printing material solidified in the step c) may be brought into contact in a horizontal direction with the printing material controlled with the thickness in the step e) on the identical plane, so as to form and solidify the single layer comprising different components.

Additionally, in the steps f) to g), the printing material solidified in the step c) may be brought into contact with the printing material controlled with the thickness in the step e) on the different planes, so as to form and solidify each layer comprising the single component.

Additionally, in the step j), the concave build plate in contact with the printing material may be coupled to the convex build plate placed on an upper portion of the concave build plate, and the convex build plate comprises the protruding parts which are extended to be longer than the depth of the punched part formed on the concave build plate, so as to separate to the multi-layer 3D object from the concave build plate.

Additionally, the 3D printing method for multiple materials according to an embodiment of the present invention may further comprise collecting the materials not solidified among the supplied printing materials, to resupply the same to the material supply unit.

Advantageous Effect

The present invention has an advantage of injecting and solidifying different printing materials to each layer using a material supply unit capable of selectively injecting printing materials to the respective layers.

Additionally, the present invention has an advantage of forming a single layer by solidifying the different printing materials using a material transfer unit and a 3D printing module. As such, it is an advantage of the present invention to apply to various 3D technical fields using composite materials such as functionally gradient materials, ceramic materials, photopolymerization resins, and the like.

Additionally, according to the present invention, the method includes additional solidifying process followed by washing or drying the printing materials other than the solidified layer using a material processing module, with an advantage of preventing mixing between printing solutions in adjacent layers and reducing the printing time.

Additionally, the 3D printer is provided with a concave type and a convex type build plates, with protruding parts of the convex build plate formed to have a length greater than a depth of a punched part formed on the concave build plate, allowing to easily separate the object by reducing external force applied when separating the multi-layer 3D object attached on the concave build plate.

DESCRIPTION OF DRAWINGS

The application of the preferred embodiments of the present invention is best understood with reference to the accompanying drawings, wherein:

FIG. 1 is a cross-sectional view illustrating the 3D printing device according to an embodiment of the present invention.

FIG. 2 is a side view illustrating the 3D printing device according to an embodiment of the present invention.

FIGS. 3 to 5 illustrate the types of the material supply unit according to an embodiment of the present invention.

FIG. 6 illustrates the build plate according to an embodiment of the present invention.

FIG. 7 illustrates the principle of separating the multi-layer 3D object according to an embodiment of the present invention.

FIG. 8 is a diagram illustrating the 3D printing method for multiple materials according to an embodiment of the present invention.

FIG. 9 illustrates the 3D printing device according to an embodiment of the present invention.

FIG. 10 is a side sectional view and a cross-sectional view of the multi-layer 3D object according to an embodiment of the present invention.

FIG. 11 is a side sectional view and a cross-sectional view of the multi-layer 3D object according to another embodiment of the present invention.

FIGS. 12 and 13 illustrate the multi-layer 3D object according to another embodiment of the present invention.

FIGS. 14 and 15 illustrate the thickness control capability for the 3D printing device according to an embodiment of the present invention.

FIGS. 16 and 17 illustrate the printing process of the 3D printing device according to an embodiment of the present invention.

FIGS. 18 to 20 illustrate the printing sample according to an embodiment of the present invention.

BEST MODE

Hereinafter, the embodiments of the present invention are illustrated in more detail with the diagrams attached herein. The invention may be embodied in many different forms and should not be construed as being limited to the embodiments set forth herein. Like reference numerals designate like elements throughout the specification.

These embodiments are provided so that the object and the effect of the present invention will be thorough and complete, and will fully convey the concept of the invention to those skilled in the art, but not limited thereto. In the explanation of the present invention, the description on the composition or functions in association with the present invention that are clearly understood by those in the art but might obscure the point of the invention can be omitted.

The 3D printing device (1000) according to the present invention is a lamination type printing device, with laminating layers in a top-down direction. That is, the 3D printing device may be a printing device applied with top-down method of forming one layer of the printing material and laminating the other layer coming into contact with a bottom surface of the one layer. The 3D printing device (1000) may be applied in various fields such as medical or engineering field according to the injected printing materials and the multi-layer 3D object (9) formed by printing. In particular, the 3D printing device may form a single layer having different multiple materials when there is a need for printing different materials in various fields.

FIG. 1 is a cross-sectional view illustrating the 3D printing device (1000) according to an embodiment of the present invention. Referring to FIG. 1, the 3D printing device (1000) may comprise a material transfer unit (1100), a material supply unit (1200), a thickness control unit (1300), a 3D printing module (1400), and a material processing module (1500), and may also comprise a collecting module (1600, FIG. 2). Additionally, the 3D printing device (1000) may define a shape of cross-section by various types of films (8, 8a, 8b, 8c). FIG. 2 is a side view illustrating the 3D printing device (1000) according to an embodiment of the present invention. Referring to FIG. 2, the material transfer unit (1100) may comprise a roll element (1110), a motor (1120), and a height control element (1130).

The material transfer unit (1100) may supply at least two films.

According to the embodiment of the present invention, the material transfer unit (1100) may comprise a plurality of lines. That is, the material transfer unit (1100) may supply films by including two different lines as shown in FIG. 1. The material transfer unit (1100) provided in different lines may induce moving the 3D printing module (1400) to consecutively perform solidifying-washing/drying-solidifying-washing/drying steps. In particular, when the 3D printing module (1400) is provided as a rotary type, the 3D printing module (1400) may induce to consecutively perform solidifying-washing/drying-solidifying-washing/drying steps by repeated rotation. A user may change a rotation radius of the rotary type 3D printing module (1400) by adding and/or deleting the line of the material transfer unit (1100). Additionally, when only one material transfer unit (1100) is provided, the volume of the printing device may be reduced by reducing the rotation angle of the 3D printing module (1400).

Meanwhile, the material transfer unit (1100) may supply multiple types of films on a single line. Each material transfer unit (1100) may supply various types of films as indicated by the reference numerals 8a, 8b and 8c. The user may selectively supply the multiple types of films in accordance with a predefined shape.

The roll element (1110) may be wrapped by the line, and at least one roll elements (1110) may be provided.

According to the embodiment, the roll element (1110) may maintain the tension of the line, and collect the used film. At this time, the height control element (1130) may control a height of collecting the film. At least one roll element (1110) may be provided, with each roll element (1110) having varied radius when a plurality of roll elements (1110) are provided.

The motor (1120) may drive the roll element (1110).

According to the embodiment, the motor (1120) is directly or indirectly connected to the roll element (1110) so as to induce a rotary movement of the roll element (1110). The motor (1120) may control a rotation speed of the roll element (1110). The motor (1120) may be provided in a number identical to the roll element (1110), or a single motor (1120) may be connected to a single roll element (1110) to drive the roll element (1110).

The height control element (1130) may control the height of the roll element (1110).

According to the embodiment, the height control element (1130) may control the height so as to bring one surface of the roll element (1110) into contact with the height of collecting the film. The height control element (1130) may control the height of the roll element (1110) or the motor (1120) in accordance with the designed form of the material transfer unit (1100). More specifically, the films (8a, 8b, 8c, 8d) placed on the material transfer unit (1100) may move in a horizontal state by the rotation of the motor (1120). At this time, the height control element (1130) may control the position in a height direction (z-axis direction) at which the films (8a, 8b, 8c, 8d) are supplied. Additionally, the height control element (1130) may control to maintain the height of the material transfer unit (1100) and the motor (1120) in a horizontal state by controlling the height of the motor (1120). To this end, a plurality of height control elements (1130) may be provided so as to independently control the heights of the material transfer unit (1100) and the motor (1120).

FIGS. 3 to 5 illustrate the types of the material supply unit (1200) according to an embodiment of the present invention. Referring to FIGS. 3 to 5, the material supply unit (1200) may comprise a syringe type (2200), an extrusion container type (3200), and a slurry supply plate type (4200).

The material supply unit (1200) may supply at least one type of printing material on each line on the material transfer unit (1100).

In the embodiment, the material supply unit (1200) may be provided in association with the material transfer unit (1100). The material supply unit (1200) may supply one type of printing material to the single film. The printing material supplied by the material supply unit (1200) may be the printing material which is initially injected by the user, and also may be the unused printing material after the printing process which is resupplied in a collected form. When a plurality of material transfer unit (1100) is provided to transfer a plurality of films, the material supply unit (1200) may provide an identical material or varied printing materials to each film. The material supply unit (1200) may store multiple types of printing materials (A, B, C, D, E, F). The material supply unit (1200) may change the printing material supplied in accordance with the type of material required in the printing process. The combinations of the plurality of material supply units (1200) and the plurality of material transfer units (1100) are able to fabricate the object using multiple materials.

The syringe type material supply unit (2200) may be equipped with a mixing screw. The syringe type material supply unit (2200) may comprise a cylinder to accommodate the printing material therein, the mixing screw equipped inside the cylinder, an extrusion syringe to extrude the printing material on the line, and a hydraulic motor to induce a vertical movement of the extrusion syringe.

The extrusion container type material supply unit (3200) may be equipped with a mixing agitator. The extrusion container type material supply unit (3200) may comprise a case to accommodate the printing material therein, the mixing agitator mounted inside the case so as to stir the printing material, an outlet to discharge the printing material on the line, and a pressure control motor to control the extrusion pressure.

A slurry supply plate type material supply unit (4200) may apply the printing material on a plane in the line during the rotation of the line wrapped on the material transfer unit.

A thickness control unit (1300) may control a thickness of the material supplied by the material supply unit (1200).

According to the embodiment, the thickness control unit (1300) may be provided respectively at the material transfer unit (1100). The thickness control unit (1300) may control the height and the thickness of the film filled with the printing material. The thickness control unit (1300) may accurately set the height and the thickness of the single layer when solidifying a single material. Additionally, the thickness control unit (1300) may be set to an identical height and thickness when forming the single layer with different materials, in order to prevent forming a height gap between the different parts solidified at the respective material transfer units (1100) by the rotary type 3D printing module (1400). As such, it is possible to accurately fabricate the multi-layer 3D object (9) in overall.

The 3D printing module (1400) may solidify the material having the thickness controlled by the thickness control unit (1300) into a predefined shape, and may solidify the material on the other line by moving to the other line after solidifying the material on one line.

In the embodiment, the 3D printing module (1400) may solidify the materials on each material transfer unit (1100) by receiving the film filled with the printing material. The 3D printing module (1400) may move in a horizontal direction to perform solidifying-washing/drying-solidifying-washing/drying steps. In particular, according to an embodiment, the 3D printing module (1400) may be a rotary type, a horizontal movement type, and the like, which may be applied with all movement types to sequentially solidify the materials depending on the types of providing a plurality of lines. Meanwhile, the 3D printing module provided as the rotary type may rotate in a predefined angle. A rotary type 3D printing module will be described as an example in the following section. However, the other types of 3D printing module may be applied with the identical process, except for a rotational movement of the rotary type 3D printing module.

The rotation angle of the rotary type 3D printing module (1400) may be changed depending on the number of lines provided on the material transfer unit (1100). When the material transfer unit (1100) is provided with a single line, the rotation range of the rotary type 3D printing module (1400) is set to an angle between the material transfer unit (1100) and the material processing module (1500), so as to rotate within the corresponding angle. Additionally, when the material transfer unit (1100) is provided with a plurality of lines, the rotation range of the rotary type 3D printing module (1400) may be set to have various rotation ranges, and rotation and movement directions.

Meanwhile, the rotary type 3D printing module (1400) may rotate in a horizontal direction attached by a portion of the single layer having a first printing material solidified, and placing a portion of the single layer having the first printing material solidified on a location in parallel to the film of the line filled with a second printing material and solidifying the same, so as to form the single layer comprising different components.

The rotary type 3D printing module (1400) is provided to form a portion of a single layer by solidifying the printing material on one line of the material transfer unit (1100), and to rotate in a horizontal direction to the other line of the material transfer unit (1100) with a portion of the single layer attached thereto so as to solidify the printing material on the other line of the material transfer unit (1100) in contact with a portion of the single layer on an identical plane, so as to form the single layer comprising different components.

In the embodiment, the material supply unit (1200) may fill the single film included in a first line (1100a). The filled film may be solidified by the 3D printing module (1400). In the embodiment, the first printing material (A) is defined as the initially filled printing material. The single layer on which the first printing material (A) is solidified may be attached on the rotary type 3D printing module (1400), to move to the other line (1100b) through a horizontal rotation. The first printing material (A) solidified may be immersed to the film filled with the second printing material (B). The first and second printing materials are defined only to distinguish the sequence, which may be identical or different materials. The 3D printing module (1400) may solidify the second printing material (B) where the first printing material (A) is immersed. Thereby, the rotary type 3D printing module (1400) may form the single layer comprising different materials which are in contact with each other on the identical plane.

Meanwhile, in the above-described process, the first printing material (A) may be moved to the material processing module (1500) after solidifying so as to be washed and dried, and such process is for preventing mixing of the first printing material (A) and the second printing material (B) in the process of forming the identical single layer. Additionally, such process may wash the materials not solidified among the first printing material (A) so as to provide a region for solidifying the second printing material (B), thereby forming the single layer comprising different materials in accordance with predefined characteristics.

The 3D printing module (1400) is provided to form a single layer by solidifying the printing material on one line of the material transfer unit (1100), and to move to the other line of the material transfer unit (1100) with the single layer attached thereto so as to solidify the printing material on the other line of the material transfer unit (1100) in contact with the single layer on a different plane, so as to form the single layer comprising a single component.

In the embodiment, the material supply unit (1200) may fill a single material to the film. Subsequently, the filled film (8) may move to the rotary type 3D printing module (1400) by the operation of the material transfer unit (1100). The rotary type 3D printing module (1400) may solidify the single layer, and transfer the solidified to the material processing module (1500) to wash and dry the same. Unlike the previous processes, all the printing materials filled in the film (8) are solidified in this process, which is followed by the subsequent process of forming a single layer coming into contact with the bottom surface of the solidified single layer.

Referring to FIG. 2 again, the rotary type 3D printing module (1400) may comprise a light emission unit (1410), a substrate (1420), a build plate (1430), a printing chamber (1440), and a vacuum pump (1450).

The light emission unit (1410) may be located on a lower part of the rotary type 3D printing module (1400) to irradiate lights upwards. The light emission unit (1410) may move simultaneously with the 3D printing module (1400). The light emission unit (1410) may irradiate lights to the substrate (1420). The light irradiated from the light emission unit (1410) may penetrate the substrate (1420) to irradiate to the film. The light emission unit (1410) may irradiate various types of lights needed for solidifying the printing material. The light from the light emission unit (1410) may be irradiated by being refracted or scattered depending on the size and the shape of the film. The light emission unit (1410) may irradiate light under determined conditions of wavelengths and magnitude and the like.

The line supplied with the printing material may be placed on the substrate (1420).

The film included in the line may be placed on the substrate (1420). The temperature may be controlled with the substrate (1420) so as to solidify the film filled with the printing material. The substrate (1420) may be included in the rotary type 3D printing module (1400) to move simultaneously. The substrate (1420) may further include additional configurations such as a punched part for reduced pressure or a vacuum pump (1450) to maintain the vacuum condition, so as to closely attach the film in a flat state. Such condition is required to keep an accurate horizontal state at the time of attaching the film placed on the substrate (1420) with the build plate (1430), which has an advantage of improving reliability and reproducibility of the printed object.

The substrate (1420) may be provided as a transparent material in order to pass through the light irradiated from the light emission unit (1410).

According to the embodiment of the present invention, the substrate (1420) may be provided in the transparent material such as glasses, so as to pass through the light irradiated from the light emission unit (1410) and transfer the same to the film. The substrate (1420) may be provided as a material which does not deform by the light irradiated from the light emission unit (1410).

The substrate (1420) may be driven upward and downward, so as to control the height of the printing material place on top surface of the substrate (1420).

In the embodiment, the substrate (1420) may be positioned with the line comprising the film filled with the printing material. The substrate (1420) with the line positioned thereon may be driven upward and downward, and the height may be controlled to place the top surface of the material to come into contact with a lower surface of the build plate (1430). After contacting the printing material and the build plate (1430), the substrate (1420) may be lowered to maintain a horizontal state of the line.

More specifically, the substrate (1420) may further comprise a height control element (not shown) for controlling height. Thereby, the height may be controlled on the substrate (1420) of the film (p) supplied to the material transfer unit (1100). In particular, the substrate (1420) may control a position in a height direction (z-axis direction) at which the film (p) is supplied, when the 3D printing module (1400) is stopped on the material transfer unit (1100) for photo curing, or when the 3D printing module (1400) is in operation. At this time, the height control element (not shown) may induce to horizontally receive the film from the material transfer unit (1100) by controlling the height of the substrate (1420). As such, the substrate (1420) may control the height independently from the material transfer unit (1100).

Meanwhile, the substrate (1420) may control the solidification height of the printing material included in the film (p) supplied from the first moving stage (50). Accordingly, the substrate (1420) may improve the solidification efficiency of the printing material by the height control during the solidification process of the film. Additionally, the substrate (1420) may transfer the film completed with the solidification to a subsequent material transfer unit (1100). To this end, the substrate (1420) is set to the height identical to the material transfer unit (1100), to facilitate transferring the film.

The build plate (1430) may be attached with the printing material on the line.

According to the embodiment of the present invention, the build plate (1430) may be attached with the film positioned on the substrate (1420). The build plate (1430) may move downward so as to be attached with the printing material. The build plate (1430) may have a configuration to be easily separated from the completed 3D object. The configuration may be described in details as below by referring to FIGS. 6 and 7.

FIG. 6 illustrates the build plate (1430) according to an embodiment of the present invention.

Referring to FIG. 6, the build plate (1430) may comprise a concave build plate (1431) and a convex build plate (1432). The concave build plate (1431) and the convex build plate (1432) may be coupled together.

The concave build plate (1431) is formed with punched parts repeatedly, to which the printing material is attached. In particular, the printing material may be attached to the bottom surface of the concave build plate (1431). The concave build plate (1431) may be driven upward and downward. In particular, the concave build plate (1431) may be driven independently from the convex build plate (1432). Thereby, the user may induce to couple the concave build plate (1431) with the convex build plate (1432).

Meanwhile, the convex build plate (1432) may be formed with protruding parts repeatedly corresponding to be inserted to the punched part. The protruding parts of the convex build plate (1432) may be coupled to the punched parts. The convex build plate (1432) may be located on an upper part of the concave build plate (1431). The convex build plate (1432) may be driven upward and downward. In particular, the convex build plate (1432) may be driven independently from the concave build plate (1431). The separation of the 3D object by driving the concave/convex build plates will be described in detail by referring to FIG. 7.

FIG. 7 illustrates the principle of separating the multi-layer 3D object (9) according to an embodiment of the present invention.

The protruding part is formed to be longer than a depth of the punched part, so as to separate the material attached on the concave build plate (1431) when coupling the convex build plate (1432) and the concave build plate (1431).

In the embodiment, it is notable that the length of the protruding part is formed to be longer than the depth of the punched part. If the length of the protruding part is shorter than the depth of the punched part, the separation does not take place since the pressure by the protruding part is not delivered to the 3D object, when coupling the concave/convex build plates. In contrast, if the length of the protruding part is longer than the depth of the punched part, the protruding part exposed by exceeding the punched part may be brought into contact with the 3D object attached on the concave build plate (1431), when coupling the concave/convex build plates. Accordingly, the pressure applied on the convex build plate (1432) may be delivered to the 3D object by each protruding part. Accordingly, the present invention may improve the quality of the object obtained, by solving a problem of the conventional 3D printing device from separating the object using a knife, a separating device or the like making defects on the object by the stress concentrated on one surface.

The protruding part may have one end inserted to the punched part having a cross-sectional area smaller than that of the other end on a bottom direction of the convex build plate (1432).

According to the embodiment, the protruding part may be provided in a pillar shape having an inclination on lateral surfaces. That is, the cross-section of a side view may be provided in shapes such as ∩ and Λ, which is specified to illustrate the difference in the cross-sectional areas between one end of inserting direction and the other end on the bottom direction. The protruding part having the above-described shape may be easily inserted to the punched part by the one end having a narrow cross-sectional area. The quality of the printing material may be improved by reducing the area of the punched part in the process of coupling the printing material to the bottom surface of the concave building plate (1431).

More specifically, when the punched part is formed as a large area, the printing material may penetrate to inside of the concave build plate (1431), resulting in reduced quality of the surface. In contrast, when the punched part is formed as a small area, the penetration of the printing material may be reduced, resulting in the improved quality of the printing material surface.

Meanwhile, the protruding part of the convex build plate (1432) may have difficulty in being inserted to the punched part, when the punched part is formed as the small area. The protruding part according to the embodiment may be easily inserted to the punched part, as the area of one end of the protruding part formed to be smaller than the area of the other end on the bottom direction.

The printing chamber (1440) may accommodate the light emission unit (1410), the substrate (1420) and the build plate (1430), and may move in parallel to the material transfer unit (1100).

According to the embodiment, the printing chamber (1440) may be a container to accommodate the light emission unit (1410), the substrate (1420), and the build plate (1430). The printing chamber (1440) may move in accordance with a printing process in progress. The printing chamber (1440) may keep the vacuum state therein so as to improve the quality of the object, or may require additional configurations in order to reduce the pressure.

A vacuum pump (1450) may remove gas inside the printing chamber (1440).

According to the embodiment, the vacuum pump (1450) may be provided inside the printing chamber (1440) or connected to the outside. The vacuum pump (1450) may be a constitutional element to improve the quality of the 3D object formed by the printing. In particular, the vacuum pump (1450) may be provided to make the most proper condition to attach the film and the printing material to the build plate (1430) placed inside the printing chamber (1440).

The material processing module (1500) may wash the rotary type 3D printing module (1400). Additionally, the material processing module (1500) may dry the rotary type 3D printing module (1400).

According to the embodiment, the material processing module (1500) may wash or dry the printing material solidified inside the rotary type 3D printing module (1400). The material processing module (1500) is provided to reduce the time spent for contacting the single layer to another single layer. The material processing module (1500) may be provided in a single or multiple numbers as needed. The material processing module (1500) may prevent the mixing between the materials when different materials are supplied between the supply lines.

Referring to FIG. 2 again, the material processing module (1500) may comprise a first material processing module (1510), a second material processing module (1520), and a third material processing module (1530). In the embodiment, the first material processing module (1510) may wash the material, and the second material processing module (1520) may wash again the material washed by the first material processing module (1510). The third material processing module (1530) may dry the printing material which is completed in washing. The respective material processing modules (1500) may be modified as to the objective and the function depending on needs and design requirements, and may be provided by adding/deleting the configuration in order to improve the printing efficiency.

The collecting module (1600) may collect the unused printing material unused by the rotary type 3D printing module (1400) provided to the material transfer unit (1100). The collecting module (1600) may separate and collect the printing material unused after supplied on the material transfer unit (1100), and may supply the collected printing material back to the material supply unit (1200). As such, the 3D printing device (1000) according to the embodiment of the present invention may repeatedly use the initially injected printing material. Thereby, the 3D printing device (1000) may improve the efficiency in using the printing material. Additionally, the collecting module (1600) may be connected to a portion of a plurality of height control elements (1130) or the material transfer units (1100), by controlling the height. When the collecting module (1600) is provided to be connected to the material transfer unit (1100), the collecting module (1600) may be located on a lower part of the material transfer unit (1100), to move in an identical height. Additionally, the collecting module (1600) may move independently in a height direction to the material transfer unit (1100) in connection to the height control element (1130). Meanwhile, the collecting module (1600) needs to keep a predefined distance from the material transfer unit (1100), to prevent damage or contamination or the like on the 3D printing device (1000) when collecting the unused printing material.

FIG. 8 is a diagram illustrating a 3D printing method for multiple materials according to an embodiment of the present invention. Referring to FIG. 8, the 3D printing method comprises: a) a step of supplying the first printing material (S1); b) a step of controlling the thickness of the first printing material (S2); c) a step of solidifying the first printing material (S3) and a step of washing and drying the material (S4); d) a step of supplying the second printing material (S5); e) a step of controlling the second printing material thickness (S6); f) a step of solidifying the second printing material (S7); and i) a step of forming the 3D object (S8). Subsequently, the method may further comprise j) a step of separating the 3D object (S9). Additionally, the method may further comprise a step of reusing by collecting the material which was not used for printing among the supplied printing materials. Meanwhile, since FIG. 8 illustrates the printing method according to an embodiment, the user may implement an embodiment of excluding the material washing and drying step (S4) as needed. The 3D printing method of the multiple materials according to the embodiment may be the process of printing the multi-layer 3D object using the above-described 3D printing device (1000), which may be applied with the process described as follows.

a) The step of supplying the first printing material (S1) may supply at least one type of material among various types from the material supply unit (1200) having at least one type of printing material to the film positioned on the first line (1100*a*) of the material transfer unit (1100). The supplied film may move by the rotation of the roll element (1110) and the motor (1120). When a plurality of material transfer units (1100) are provided, the different materials may be supplied to the respective films.

b) The step of controlling the thickness of the first printing material (S2) may control the thickness of the printing material supplied in the step a) (S1) to a predefined thickness by the first thickness control unit. The film controlled with the thickness may be delivered to the 3D printing module. According to the embodiment, the first thickness control unit is regarded as the thickness control unit (1300) placed on the first line (1100*a*).

c) The step of solidifying the first printing material (S3) may solidify the printing material controlled with the thickness in the step b) (S3) as being attached on the 3D printing module. In the step of solidifying the first printing material (S3), the printing material controlled with the thickness may be attached in contact with the bottom surface of the build plate (1430) of the 3D printing module. In the step of solidifying the first printing material (S3), the film delivered to the 3D printing module is placed on the substrate (1420), attached to the build plate (1430), and solidified as being irradiated with the light. When the printing material is solidified, the 3D printing module may move to the material processing module (1500) as needed. At this time, the used film may move with the material transfer unit (1100) and may be collected. The 3D printing module (1400) may solidify a portion of the printing material filled on the film, thereby forming the single layer comprising different components. Additionally, the 3D printing module (1400) may solidify the entire printing material filled on the film, thereby forming the single layer comprising the single component.

d) The step of supplying the second printing material (S5) may supply the printing material to the second line (1100b) which is differed from the line in the step a) (S1). The printing material supplied in the step of supplying the second printing material (S5) may be identical or different from the printing material provided in the step a) (S1) depending on the condition to form the layer.

e) The step of controlling the second printing material thickness (S6) may control the thickness of the printing material supplied in the step d) (S5) by the second thickness control unit. The film controlled with the thickness may be delivered to the 3D printing module. According to the embodiment, the second thickness control unit is regarded as the thickness control unit (1300) placed on the second line (1100b).

f) The step of solidifying the second printing material (S7) may move the printing material solidified in the step c) (S3) to the second line (1100b) by moving the 3D printing module and solidifying the same brought into contact with the printing material controlled with the thickness in the step e) (S6). The contact in the corresponding step refers to contacting adjacently in a horizontal direction. At this time, the step f) (S7) allows the printing material solidified in the step c) (S3) to be brought into contact in a horizontal direction with the printing material controlled with the thickness in the step e) (S6) on the identical plane, so as to form and solidify the single layer comprising different components.

Additionally, the step f) (S7) refers to the contact among an upper layer and a lower layer in multiple layers. At this time, the step f) (S7) allows the printing material solidified in the step c) (S3) to be brought into contact with the printing material controlled with the thickness in the step e) (S6) on the different planes, so as to form and solidify each layer comprising the single component.

Meanwhile, the step g) may be performed for an additional printing of the printing material up to the step f) (S7), as the step of moving the printing material solidified in the step f) to the first line (1100a) by moving the 3D printing module and solidifying the same brought into contact with the printing material.

Additionally, the step h) may be performed as the step of moving the printing material solidified in the step g) to the second line (1100b) by moving the 3D printing module, and solidifying the same brought into contact with the printing material.

That is, the steps g) to h) may be performed in order to form the single layer, and the corresponding steps may be repeated as needed. The corresponding step may be defined as the step i) (S8), and the multi-layer 3D object may be formed through the step i) (S8).

j) The step of separating the 3D object (S9) may separate the multi-layer 3D objected formed in the step i) (S8) from the 3D printing module. In the step j) (S9), the concave build plate (1431) in contact with the printing material are coupled to the convex build plate (1432) placed on an upper portion of the concave build plate (1431), and the convex build plate (1432) comprises the protruding parts which are extended to be longer than the depth of the punched part formed on the concave build plate (1431), so as to separate to the multi-layer 3D object from the concave build plate (1431). Accordingly, the user may obtain the multi-layer 3D object formed under a predefined condition.

Meanwhile, the method may further comprise a step of washing the printing material solidified through the steps a) (S1) to i) (S8) by moving to the material processing module (1500) by moving the 3D printing module. More specifically, the washing may be conducted in the step by the first and second material processing modules (1510, 1520).

Additionally, the method may further comprise a step of drying the printing material solidified through the step a) (S1) to the step i) (S8) by moving to the material processing module (1500) through moving the 3D printing module. More specifically, the drying may be conducted in the step by the third material processing module (1530). Through the above-described washing step and drying step, the method is able to prevent mixing of the materials constituting each single layer, and reduce the time spent for the printing.

In particular, when the step c) fills and solidifies a portion of the single layer on a single line with the printing material, the remaining printing materials on the area without the solidified printing material may be washed and dried, thereby to fill and solidify with different material on the remaining portion of the identical single layer by moving to the different line. As such, it is possible to reduce the time spent for forming the single layer comprising different materials.

Meanwhile, the materials other than the printed area among the supplied materials are stored separately on the respective lines, and the store material may be returned to the material supply unit (1200) by circulation. The returned material may be controlled to a predefined thickness of the thickness control unit (1300) and delivered back to the material transfer unit (1100). Accordingly, the efficiency may be improved for the printing materials.

As above, the 3D printing device for multiple materials (1000) and the 3D printing method for multiple materials are described, which will be described in details with reference to the examples in the following.

EXAMPLE 1

FIG. 9 illustrates the 3D printing device (1000) according to an embodiment of the present invention. In the embodiment of the present invention, it can be identified that material A and material B are supplied to different lines by a plurality of material transfer units (1100).

EXAMPLE 2

FIG. 10 is a side sectional view and a cross-sectional view of the multi-layer 3D object (9a) according to an embodiment of the present invention. Referring to the Example 2, it is identified that the single layer of the multi-layer 3D object (9a) is formed by a uniform material. Additionally, referring to FIG. 8, the heights of each layer are uniformly formed to a predefined value. In particular, according to the embodiment, the printed object was sintered at the temperature of 1600° C., which showed that the shape of the object was maintained without creating cracks after sintering.

EXAMPLE 3

FIG. 11 is a side sectional view and a cross-sectional view of the multi-layer 3D object (9b) according to another embodiment of the present invention. FIGS. 12 and 13 illustrate the multi-layer 3D object according to another embodiment of the present invention. In the sample of FIG. 11, the material A is alumina, and the material B is calcium phosphate, which are used for printing. The multi-layer 3D object of FIGS. 12 and 13 are MLCC (multi layer ceramic condenser) structure. In the embodiment, it is shown that the different materials of the material A and the material B are mixed to form the single layer of the multi-layer 3D object (9b). Additionally, it is shown that the object is formed by printing the identical material on the different layers. Referring to FIGS. 11 to 13, it is shown that the height of each single layer is uniformly formed. Thereby, a mixing ratio among the materials may be adjusted as needed by design, and the height of each single layer may be formed identically even when the different materials are provided.

EXAMPLE 4

FIGS. 14 and 15 illustrate the thickness control capability for the 3D printing device (1000) according to an embodiment of the present invention. The 3D printing device may control the thickness up to at least 10 μm mechanically. Meanwhile, referring to FIGS. 14 and 15, it shows the evaluation is performed from 20 μm for a reliable printing. Referring to the examples for each thickness, it is identified that each layer is distinguished by clearly forming the layers having the predefined thickness. The thickness of the sample produced accordingly may be varied depending on the solidifying capacity of material. Although the example is evaluated up to 125 μm, the maximum thickness which can produced by the 3D printing device may not be limited thereto.

EXAMPLE 5

FIGS. 16 and 17 illustrate the printing process of the 3D printing device (1000) according to an embodiment of the present invention. Referring to FIG. 16, the different materials are printed as the first line (1100a) and the second line (1100b) at the material transfer unit (1100). It is shown that the printed material is transferred to right side by the first line (1100a), leaving the portion of the printed material empty.

The rotary type 3D printing module (1400) formed with the object in the first line (1100a) may move to the material processing module (1500) by height control and rotation, and the washing step is performed by controlling the height, and the drying step is performed by height control and by rotation. After drying the object, the rotary type 3D printing module (1400) may rotate to move to the second line (1100b), and the printing is performed by resetting to the height of the printing material transferred by the second line (1100b).

Referring to FIG. 17, the materials transferred to each line of the material transfer unit (1100) is isolated and stored at each line, and the stored material may be returned to the material supply unit (1200) by circulation. The returned material may be controlled to a predefined thickness of the thickness control unit (1300) to be transferred back to the material transfer unit (1100). In particular, FIG. 17 shows a process of treating the collected material. It shows the remaining alumina slurry after using in the material transfer unit (1100) is collected in a liquid phase at the collecting module (1600), and the film is separated from the printing material to move in circulation.

EXAMPLE 6

FIG. 18 illustrates the printing sample according to an embodiment of the present invention. Example 6 was implemented to identify the printing capability of multiple materials. Referring to FIG. 18, the alumina layer formed on a top surface has 57 layers and maintained at 1425 μm. Additionally, the zircornia layer formed on a bottom surface in contact with the alumina layer has 46 layers and maintained at 1150 μm. As such, the materials are not mixed even in close contact between multiple materials by the 3D printing device (1000) according to the embodiment, which allowed a reliable forming of material layers. That is, it can be seen that the rapid solidification of materials by washing and drying processes prevented the mixing between different materials during a forming process after forming each layer.

EXAMPLE 7

FIG. 19 illustrates the printing sample according to another embodiment of the present invention. Example 7 is suggested to identify that the multiple materials can be printed on a single identical layer. Referring to FIG. 19, it is shown that the multiple materials distinguished as the material 1 and the material 2 are printed separately on the identical layer, and also the printing was effective in an embossed character region.

EXAMPLE 8

FIG. 20 illustrates the printing sample according to another embodiment of the present invention. Example 8 shows the sample produced by printing in a single line using a single material. Referring to FIG. 20, the 3D printing device (1000) may produce various shapes using a single material, which can be printed in various materials such as sawtooth, spiral, annular, net shape, and the like. In particular, the sample according to the embodiment was produced using alumina, as a sintered body which was sintered at the temperature of 1600° C. after printing.

Those skilled in the art will appreciate that the conceptions and specific embodiments disclosed in the foregoing description may be readily utilized as a basis for modifying or designing other embodiments for carrying out the same purposes of the present invention. Those skilled in the art will also appreciate that such equivalent embodiments do not depart from the spirit and scope of the invention as set forth in the appended claims.

The invention claimed is:

1. A 3D printing device for multiple materials comprising: a material transfer unit comprising at least two lines, at least one roll element on which a one line or an other line of the at least two lines is wrapped; a motor to drive the at least one roll element; and a height control element to control a height of the at least one roll element; a material supply unit configured to supply at least one type of printing material on the at least two lines; at least one thickness control unit configured to control a thickness of the at least one type of printing material supplied by the material supply unit; a 3D printing module configured to solidify the at least one type of printing material to a predefined shape on the one line of the at least two lines, and to move to the other line of the at least two lines so as to solidify an other of the at least one type of printing material on the other line of the at least two lines; a material processing module configured to wash the printing materials solidified on the one line and on the other line by the 3D printing module; and a collecting module configured to collect the printing materials not solidified at the 3D printing module on the at least two lines.

2. The 3D printing device for multiple materials of claim 1, further comprising: a further material processing module configured to dry the printing materials solidified by the 3D printing module on the one line and the other line.

3. The 3D printing device for multiple materials of claim 1, wherein the 3D printing module is provided to form a portion of a single layer by solidifying the at least one type of printing material on the one line of the material transfer unit, and move to the other line of the material transfer unit with the portion of the single layer attached to the 3D printing module so as to solidify the at least one type of printing material on the other line of the material transfer unit brought into contact with the portion of the single layer on a same plane, so as to form the single layer comprising different printing materials.

4. The 3D printing device for multiple materials of claim 1, wherein the 3D printing module is provided to
form a single layer by solidifying the at least one type of printing material on the one line of the material transfer unit, and
move to the other line of the material transfer unit with the single layer attached to the 3D printing module so as to solidify the at least one type of printing material on the other line of the material transfer unit brought into contact with the single layer on a different plane than that of the printing material on the one line, as to form another single layer comprising one printing material.

5. The 3D printing device for multiple materials of claim 1, wherein the 3D printing module comprises:
a light emission unit;
a substrate on which the one line or the other line supplied with the printing material is positioned;
a build plate to which the printing material on the one line or the other line is attached;
a printing chamber to accommodate the light emission unit, the substrate, and the build plate therein, capable of moving in a parallel direction to the material transfer unit; and
a vacuum pump to remove air in the printing chamber.

6. The 3D printing device for multiple materials of claim 5,
wherein the substrate is configured to control a height of the printing material deposited on a top surface of the substrate by moving upward and downward.

7. The 3D printing device for multiple materials of claim 5, wherein the build plate comprises:
a concave build plate formed with punched parts repeatedly to which the printing material is attached; and
a convex build plate formed with protruding parts repeatedly corresponding to be inserted to the punched parts of the concave build plate,
wherein the convex build plate and the concave build plate are independently driven upward and downward,
and the protruding parts are formed to be longer than a depth of the punched parts, so as to separate the printing material attached on the concave build plate when coupling the convex build plate and the concave build plate.

8. The 3D printing device for multiple materials of claim 5, wherein a protruding part has one end inserted to a punched part having a cross-sectional area smaller than that of an other end of the protruding part on a bottom direction of a convex build plate.

9. A 3D printing method for multiple materials using the 3D printing device according to claim 1, comprising the following steps of: a) supplying the at least one type of printing material from the material supply unit to the one line of the material transfer unit; b) controlling a thickness of the at least one type of printing material supplied in the step a) by a first thickness control unit of the at least one thickness control unit; c) supplying the other printing material to the other line which is differed from the one line in the step a); d) controlling a thickness of the printing material supplied in the step c) by a second thickness control unit of the at least one thickness control unit; e) solidifying the at least one type of printing material controlled with the thickness in the step b) as being attached on the 3D printing module; f) moving the at least one type of printing material solidified in the step e) to the other line by moving the 3D printing module and solidifying the same brought into contact with the thickness controlled other printing material in step d); g) moving the printing materials solidified in the step f) to the one line by moving the 3D printing module and solidifying the same brought into contact with an additional of the at least one type of printing material; h) moving the printing materials solidified in the step q) to the other line by moving the 3D printing module and solidifying the same brought into contact with an additional of the other of the at least one type of printing material; i) forming a multi-layer 3D object by repeating the steps g) to h); i) collecting the printing materials not solidified among the supplied printing materials on the one line and the other line by the collecting module, to resupply the same to the material supply unit; and k) performing washing of the printing materials solidified on the 3D printing module on the one line and the other line by moving the 3D printing module to a material processing module after each of the solidification processes in the steps e) to h).

* * * * *